United States Patent
Ramsey

(10) Patent No.: US 7,620,634 B2
(45) Date of Patent: Nov. 17, 2009

(54) RANKING FUNCTIONS USING AN INCREMENTALLY-UPDATABLE, MODIFIED NAÏVE BAYESIAN QUERY CLASSIFIER

(75) Inventor: William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/496,373

(22) Filed: Jul. 31, 2006

(65) Prior Publication Data
US 2008/0028010 A1    Jan. 31, 2008

(51) Int. Cl.
G06F 7/00    (2006.01)
(52) U.S. Cl. .......................................... 707/7
(58) Field of Classification Search .............. 707/7
See application file for complete search history.

(56) References Cited

U.S. PATENT DOCUMENTS

| | | | |
|---|---|---|---|
| 6,748,398 | B2 | 6/2004 | Zhang et al. |
| 7,359,898 | B1* | 4/2008 | Acton et al. ............... 707/5 |
| 2002/0107843 | A1 | 8/2002 | Biebesheimer et al. |
| 2003/0172357 | A1 | 9/2003 | Kao et al. |
| 2004/0024739 | A1 | 2/2004 | Copperman et al. |
| 2004/0044658 | A1* | 3/2004 | Crabtree et al. ............. 707/3 |
| 2004/0111419 | A1 | 6/2004 | Cook et al. |
| 2004/0249796 | A1 | 12/2004 | Azzam |
| 2005/0080782 | A1 | 4/2005 | Ratnaparkhi et al. |
| 2005/0131872 | A1 | 6/2005 | Calbucci et al. |
| 2005/0149504 | A1 | 7/2005 | Ratnaparkhi |

FOREIGN PATENT DOCUMENTS

WO    WO2006034544 A1    4/2006

OTHER PUBLICATIONS

Horton, et al., "Better prediction of protein cellular localization sites with the k nearest neighbors classifier", http://www.ncbi.nlm.nih.gov/entrez/query.fcgi?db=PubMed&cmd=Retrieve&list_uids=9322029&Dopt=Citation.
Kim, et al., 'Text Filtering by Boosting Naive Bayes Classifiers', Year of Publication 2000, pp. 168-175 , ACM Press, New York, US, http://delivery.acm.org/10.1145/350000/345572/p168-kim.pdf?key1=345572&key2=4397517411&coll=GUIDE&dl=GUIDE&CFID=709961 81&CFTOKEN=57062786.
Meretakis, et al., "Extending Naive Bayes Classifiers Using Long ltemsets", Year of Publication 1999, pp. 165-174, ACM Press, New York, USA, http://delivery.acm.org/10.1145/320000/312222/p165-meretakis.pdf?key1=312222&.
International Search Report PCT/US2007/016447, Nov. 29, 2007, pp. 1-9.

(Continued)

*Primary Examiner*—Charles Rones
*Assistant Examiner*—Fazlul Quader

(57) ABSTRACT

Methods of ranking documents on a network using an incrementally-updatable system are disclosed. Computer readable storage media having stored computer-executable instructions for performing a method of ranking documents on a network using an incrementally-updatable system are also disclosed. Further, computing devices containing at least one application module comprising application code for performing methods of ranking documents on a network using an incrementally-updatable system are disclosed.

20 Claims, 6 Drawing Sheets

OTHER PUBLICATIONS

Jiang et al, "Learning lazy naive Bayesian Classifiers for ranking", Proceeding of 17th IEEE International Conference on tools with artificial intelligence, 2005 ICTAI 05.

Zhang et al, "Augmenting Naive Bayes for ranking", Proceedings of the 22nd international conference on machine learning, Bonn, Germany, 2005.

Zhang et al, "Learning weighted Naive Bayes with accurate Ranking" Proceeding of fourth IEEE International Conference on Data mining (ICDM'04).

Zhang et al, "Naive Bayesain Classifiers for ranking", European Conference on Manchine learning (ECML) 2004.

* cited by examiner

RANKING FUNCTIONS USING AN INCREMENTALLY-UPDATABLE, MODIFIED NAÏVE BAYESIAN QUERY CLASSIFIER

BACKGROUND

Ranking functions that rank documents according to their relevance to a given search query are known. In many known systems, query classifiers are used to boost the search results of the ranking function. Known query classifiers utilize machine learning techniques such as Maximum Entropy, Naïve Bayes, Conditional Random Fields, and Support Vector Machines, to model user performance. Typically, the process used for building and deploying models is to gather a lot of data, perform off-line data processing over the entire range of data, build the models, and then deploy the models. These known processes can be computationally expensive. Further, in these processes, there is typically a delay from the time data is gathered to when the data is actually utilized in the deployed models.

Efforts continue in the art to develop ranking functions and ranking function components that provide better search results for a given search query compared to search results generated by search engines using known ranking functions and ranking function components.

SUMMARY

Described herein are, among other things, various technologies for ranking documents on a network using an incrementally-updatable, query classifier. The incrementally-updatable, query classifier does not require computationally expensive, off-line data processing, but simply requires periodic updating of a minimum number of query classifier variables. The incrementally-updatable, query classifier utilizes real-time user search query and response data, and may also comprise a time-decay component that weighs more recent user events greater than past user events. The incrementally-updatable, query classifier, alone or in combination with other ranking function components, may be used by a search engine to rank multiple documents in order (typically, in descending order) based on document relevance relative to query search terms.

This Summary is provided to generally introduce the reader to one or more select concepts describe below in the "Detailed Description" section in a simplified form. This Summary is not intended to identify key and/or required features of the claimed subject matter.

DETAILED DESCRIPTION

To promote an understanding of the principles of the methods and processes disclosed herein, descriptions of specific embodiments follow and specific language is used to describe the specific embodiments. It will nevertheless be understood that no limitation of the scope of the disclosed methods and processes is intended by the use of, specific language. Alterations, further modifications, and such further applications of the principles of the disclosed methods and processes discussed are contemplated as would normally occur to one ordinarily skilled in the art to which the disclosed methods and processes pertains.

Methods of ranking documents on a network using an incrementally-updatable query classifier are disclosed. The relevance of each document, to a given search query, is calculated using an incrementally-updatable query classifier that utilizes real-time user data for each inputted query/chosen result data combination. The document relevance for each document as determined by the query classifier alone, or in combination with other ranking function components, may be used to rank documents within a given network space (e.g., a corporate intranet space or the Internet). An exemplary search process in which the disclosed methods may be used is shown as exemplary process 10 in FIG. 1.

Figure 1:
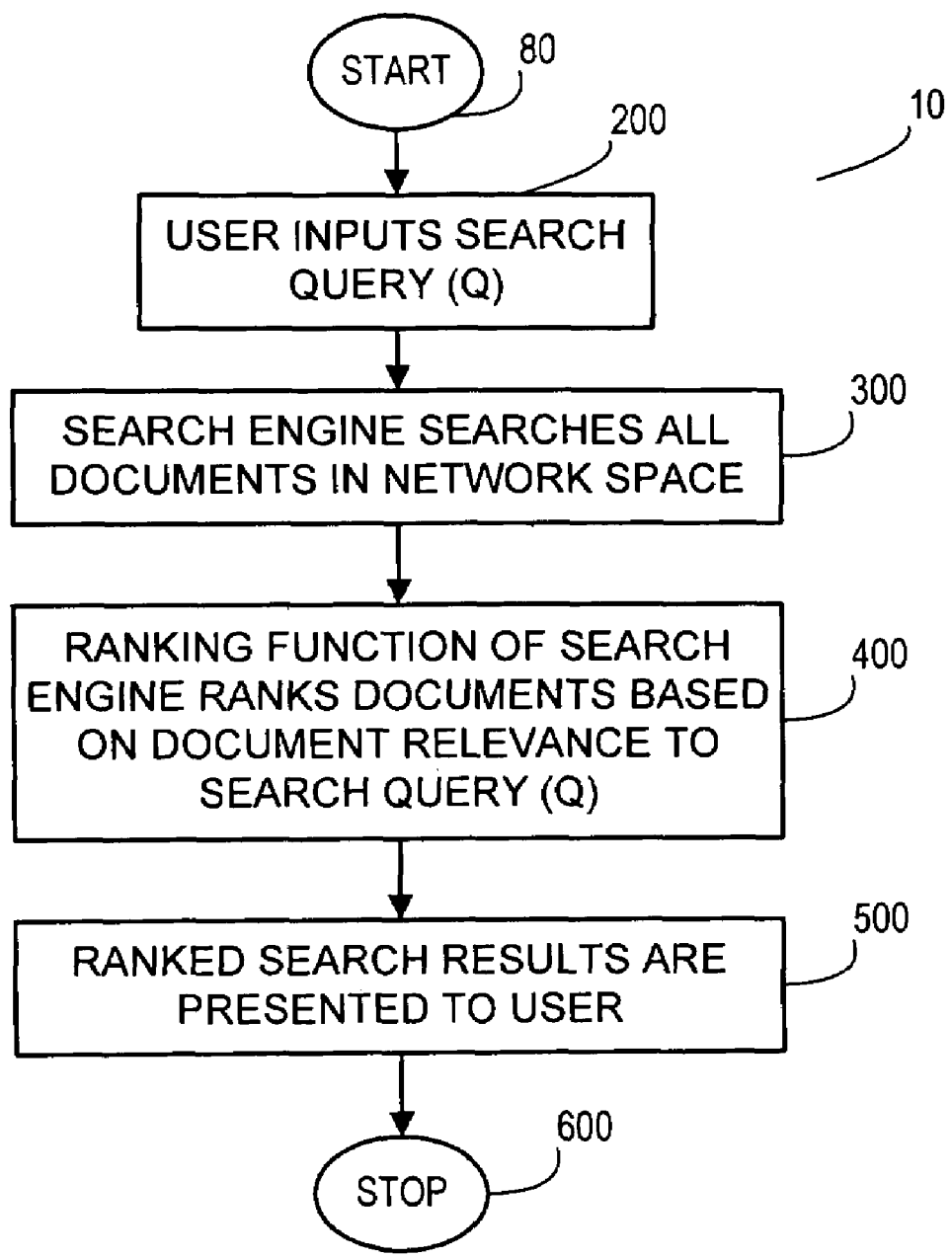
FIG. 1 represents an exemplary logic flow diagram showing exemplary steps in a method of producing ranked search results in response to a search query inputted by a user.

FIG. 1 depicts exemplary search process 10, which starts with process step 80. At step 200, a user inputs a search query. From step 200, exemplary search process 10 proceeds to step 300, wherein a search engine searches all documents within a network space for one or more terms of the search query. From step 300, exemplary search process 10 proceeds to step 400, wherein a ranking function of the search engine ranks the documents within the network space based on the relevance of each document to the search query, the document relevance being based on the probability of retrieving the document given the search query based on a modified Naïve Bayes model as described below. From step 400, exemplary search process 10 proceeds to step 500, wherein ranked search results are presented to the user, typically in descending order, identifying documents within the network space that are most relevant to the search query (i.e., have the highest probability of retrieval given a particular search query).

As discussed in more detail below, the methods of ranking documents comprises utilizing real-time "user response data" or "document usage data" related to actual usage (e.g., viewing) of one or more documents within a network space by one or more users. The document usage data is generated and stored by application code on a web server, which is separate from a given search engine. For example, document usage data may be maintained by a web site so that each time a user requests a URL, the server updates a usage counter or count value. The usage counter may maintain document-related data obtained for a given time interval, such as last week, last month, last year, or the lifetime of a given document or set of documents. Application code may be used to obtain the usage data from the web site via (i) a special application programming interface (API), (ii) a web service request, or (iii) by requesting an administration web page that returns usage data for every URL on the web site.

The document relevance may be used to rank documents within a network space, and provide the ranked search results to a user. For example, a method of ranking documents on a network may comprise the steps of determining a document relevance for each document on the network using the incrementally-updatable query classifier; and ranking the documents in a desired order (typically, in descending order) based on the document relevance of each document relative to a user inputted search query.

Application programs using the methods disclosed herein may be loaded and executed on a variety of computer systems comprising a variety of hardware components. An exemplary computer system and exemplary operating environment for practicing the methods disclosed herein is described below.

Exemplary Operating Environment

Figure 2:
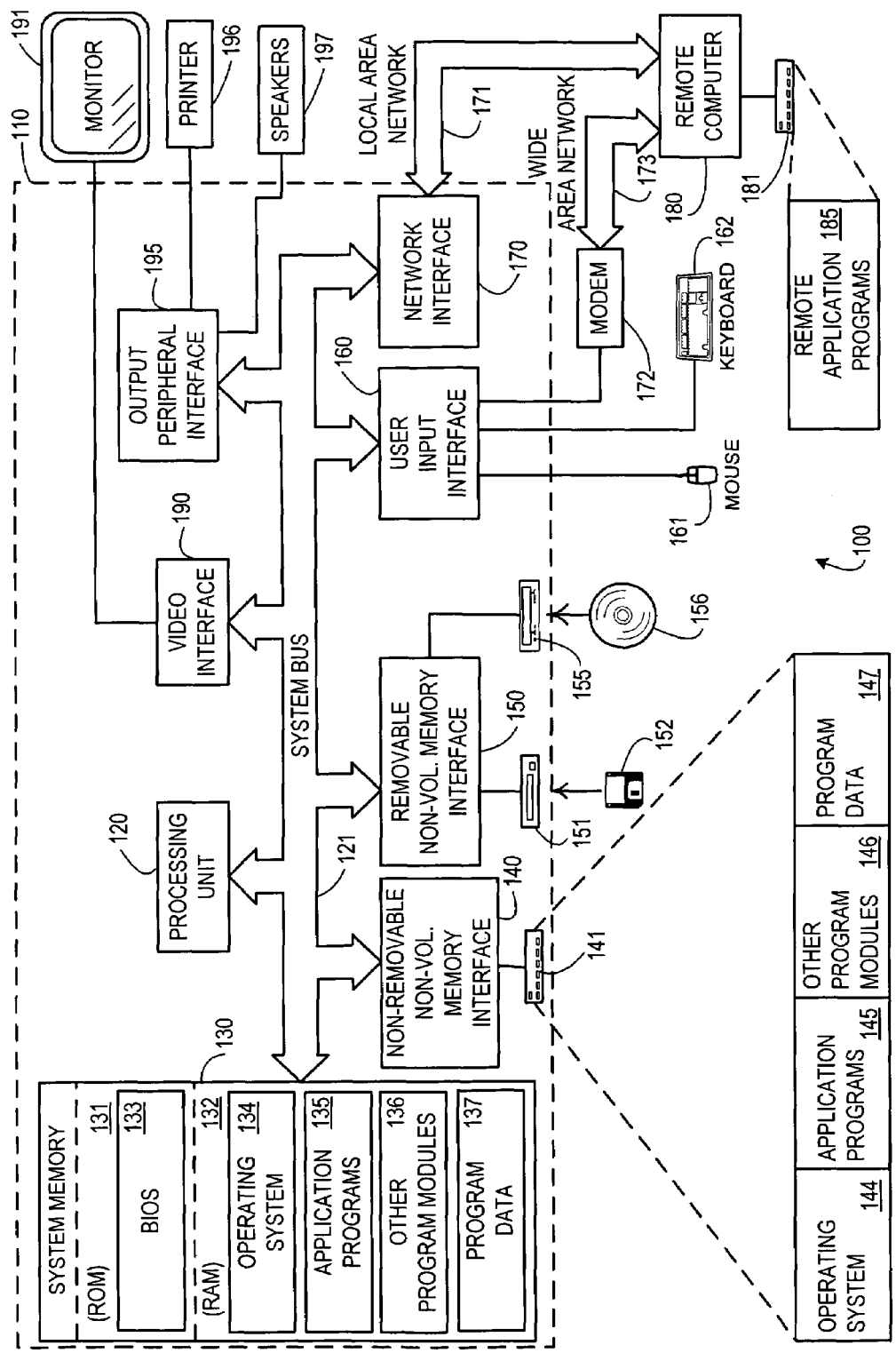
FIG. 2 is a block diagram of some of the primary components of an exemplary operating environment for implementation of the methods and processes disclosed herein.

FIG. 2 illustrates an example of a suitable computing system environment 100 on which the methods disclosed herein may be implemented. The computing system environment 100 is only one example of a suitable computing environment and is not intended to suggest any limitation as to the scope of use or functionality of the methods disclosed herein. Neither should the computing environment 100 be interpreted as having any dependency or requirement relating to any one or combination of components illustrated in the exemplary operating environment 100.

The methods disclosed herein are operational with numerous other general purpose or special purpose computing system environments or configurations. Examples of well-known computing systems, environments, and/or configurations that may be suitable for use with the methods disclosed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The methods and processes disclosed herein may be described in the general context of computer-executable instructions, such as program modules, being executed by a computer. Generally, program modules include routines, programs, objects, components, data structures, etc. that perform particular tasks or implement particular abstract data types. The methods and processes disclosed herein may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the methods and processes disclosed herein includes a general purpose computing device in the form of a computer 110. Components of computer 110 may include, but are not limited to, a processing unit 120, a system memory 130, and a system bus 121 that couples various system components including, but not limited to, system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein.

System memory 130 includes computer storage media in the form of volatile and/or nonvolatile memory such as read only memory (ROM) 131 and random access memory (RAM) 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

Computer 110 may also include other removable/non-removable, volatile/nonvolatile-computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 2 provide storage of computer readable instructions, data structures, program modules and other data for computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information (e.g., one or more search query terms or words) into computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to processing unit 120 through a user input interface 160 that is coupled to system bus 121, but may be connected by other interface and bus structures, such as a parallel port, game port or a universal serial bus (USB). A monitor 191 or other type of display device (e.g., for providing search results to a user for viewing) is also connected to system bus 121 via an interface, such as a video interface 190. In addition to monitor 191, computer 110 may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Methods and processes disclosed herein may be implemented using one or more application programs including, but not limited to, a server system software application (e.g., WINDOWS SERVER SYSTEM™ software application), a search ranking application, and an application for generating, maintaining and storing usage data of documents within a network space (e.g., WINDOWS® SHAREPOINT® Services application), any one of which could be one of numerous application programs designated as application programs 135, application programs 145 and remote application programs 185 in exemplary system 100.

As mentioned above, those skilled in the art will appreciate that the disclosed methods of ranking documents given a particular search query may be implemented in other computer system configurations, including hand-held devices, multiprocessor systems, microprocessor-based or programmable consumer electronics, networked personal computers, minicomputers, mainframe computers, and the like. The disclosed methods of ranking documents may also be practiced in distributed computing environments, where tasks are performed by remote processing devices that are linked through a communications network. In a distributed computing environment, program modules may be located in both local and remote memory storage devices.

Implementation of Exemplary Embodiments

As discussed above, methods of ranking documents on a network using an incrementally-updatable query classifier are provided. The disclosed methods of ranking documents on a network utilize a modified Naïve Bayesian model as described below.

Bayes' rule states that the probability of A given B, P(A|B), is related to the probability of B given A, P(B|A), and may be shown by the relationship:

$$P(A|B)P(B)=P(B|A)P(A)$$

When B consists of a lot of "features" $\{f_1, \ldots f_N\}$, the Naïve Bayesian approximation reduces to:

$$P(A \mid f_1, \ldots, f_N) = \frac{P(A)P(f_1, \ldots, f_N \mid A)}{P(f_1, \ldots, f_N)}$$

$$\approx \frac{P(A)\prod_{i=1}^{N} P(f_i \mid A)}{\prod_{i=1}^{N} P(f_i)}.$$

In the disclosed methods of ranking documents, the query classifier model utilizes a similar formulation, which predicts the occurrence of an "Asset" (e.g., a chosen document or "hit") given a search "Query," where the features are the terms or words in the search query. The Query Classifier model used herein is shown by the formula:

$$P(\text{Asset} \mid \text{Query}) = P(\text{Asset}) * \prod_{i=1}^{N_Q} P(w_i \in Q \mid \text{Asset}) * \prod_{i=1}^{V-N_Q} P(w_i \notin Q \mid \text{Asset})$$

wherein:

Asset is the asset or task (e.g., document) being returned,

Query is the user's query containing one or more search query terms, $N_Q$ is the number of terms in the search query, $V-N_Q$ is the number of terms not seen in the search query where V is the size of the vocabulary, $P(w_i \in Q \mid \text{Asset})$ is the probability of seeing a term in the search query, and $P(w_i \notin Q \mid \text{Asset})$ is the probability of not seeing a term in the search query.

By taking the log of both sides, the formula becomes:

$$\log[P(\text{Asset} | \text{Query})] = \log[P(\text{Asset})] + \sum_{i=1}^{N_Q} \log[P(w_i \in Q | \text{Asset})] + \sum_{i=1}^{V=N_Q} \log[P(w_i \notin Q | \text{Asset})]$$

By summing the probabilities of not seeing the terms of a given search query across all words in the vocabulary and subtracting the sum of the probabilities from the terms seen in the search query, the formulation becomes:

$$\log[P(\text{Asset} | \text{Query})] = \log[P(\text{Asset})] + \sum_{i=1}^{N_Q} (\log[P(w_i \in Q | \text{Asset})] - \log[P(w_i \notin Q | \text{Asset})]) + \sum_{i=1}^{V} \log[P(w_i \notin Q | \text{Asset})].$$

Since the probability of not seeing a word in a given search query is equal to 1 minus the probability of seeing the word in the given search query, the formulation becomes:

$$\log[P(\text{Asset} | \text{Query})] = \log[P(\text{Asset})] + \sum_{i=1}^{N_Q} (\log[P(w_i \in Q | \text{Asset})] - \log[1 - P(w_i \in Q | \text{Asset})]) + \sum_{i=1}^{V} \log[1 - P(w_i \in Q | \text{Asset})].$$

By expanding each term using the following equations:

$$\log[P(\text{Asset})] = \log[\#(\text{Asset})] - \log[\#(T)]$$

$$\log[P(w_i \in Q | \text{Asset})] = \log[\#(w_i, \text{Asset})] - \log[\#(\text{Asset})]$$

the formulation becomes:

$$\log[P(\text{Asset} | \text{Query})] = \log[\#(\text{Asset})] - \log[\#(T)] + \sum_{i=1}^{N_Q} (\log[\#(w_i, \text{Asset})] - \log[\#(\text{Asset})] - \log[1 - P(w_i \in Q \| \text{Asset})]) + \sum_{i=1}^{V} \log[1 - P(w_i \in Q | \text{Asset})]$$

wherein:

$\#(\text{Asset})$ is the number of times a given "Asset" (e.g., a given document on the network) is selected for viewing by any user;

$\#(T)$ is the total number of search queries that have been logged by the system, and $\#(w_i, \text{Asset})$ is the number of times a given "Asset" (e.g., a given document on the network) and a search query term, $w_i$, of a search query have been matched by any user.

By using a Taylor Series approximation for $\log(1-x)$:

$$\log(1-x) = -\sum_{i=1}^{\infty} \frac{x^i}{i},$$

the first-order approximation is simply $-x$. Therefore, using the first-order approximation:

$$\log[1 - P(w_i \in Q | \text{Asset})] \approx -P(w_i \in Q | \text{Asset})$$

and the sum becomes $$\sum_{i=1}^{V} \log[1 - P(w_i \in Q | \text{Asset})] \approx -\sum_{i=1}^{V} \frac{\#(w_i, \text{Asset})}{\#(\text{Asset})}.$$

The formulation of the Query Classifier model used herein now becomes:

$$\log[P(\text{Asset} | \text{Query})] = \log[\#(\text{Asset})] - \log[\#(T)] + \sum_{i=1}^{N_Q} (\log[\#(w_i, \text{Asset})] - \log[\#(\text{Asset})] + \frac{\#(w_i, \text{Asset})}{\#(\text{Asset})}) - \sum_{i=1}^{V} \frac{\#(w_i, \text{Asset})}{\#(\text{Asset})} \quad (I)$$

wherein:

$\Sigma\#(w_i, \text{Asset})$ is the sum of the number of times that a given "Asset" (e.g., a given document on the network) and any search query term, $w_i$, of the search query have been matched by any user.

By knowing the values of the terms $\#(\text{Asset})$, $\#(w_i, \text{Asset})$ and $\Sigma\#(w_i, \text{Asset})$ for each asset and each search query/asset combination, the values of $\log[\#(\text{Asset})]$ and $\log[\#(w_i, \text{Asset})]$ can be calculated, and the above formula (I) may be used to provide document relevance scores (i.e., probabilities of retrieving a given asset or document based on a given search query) for documents within a network space.

As discussed above, the actual usage or user response data (e.g., the values of the terms $\#(\text{Asset})$ and $\#(w_i, \text{Asset})$) may be obtained from one or more files that store actual usage data for one or more documents on a network. The actual usage data may be stored, along with the document, as a document component, or may be stored in a data storage file separate from the actual document. Data storage and retrieval may be accomplished using any known method including, but not limited to, web service calls, Structured Query Language (SQL) systems, etc. For example, a remote storage system may be used to store actual usage data including, for example, the number of requests to each document on a given network across all users.

Figure 3A:
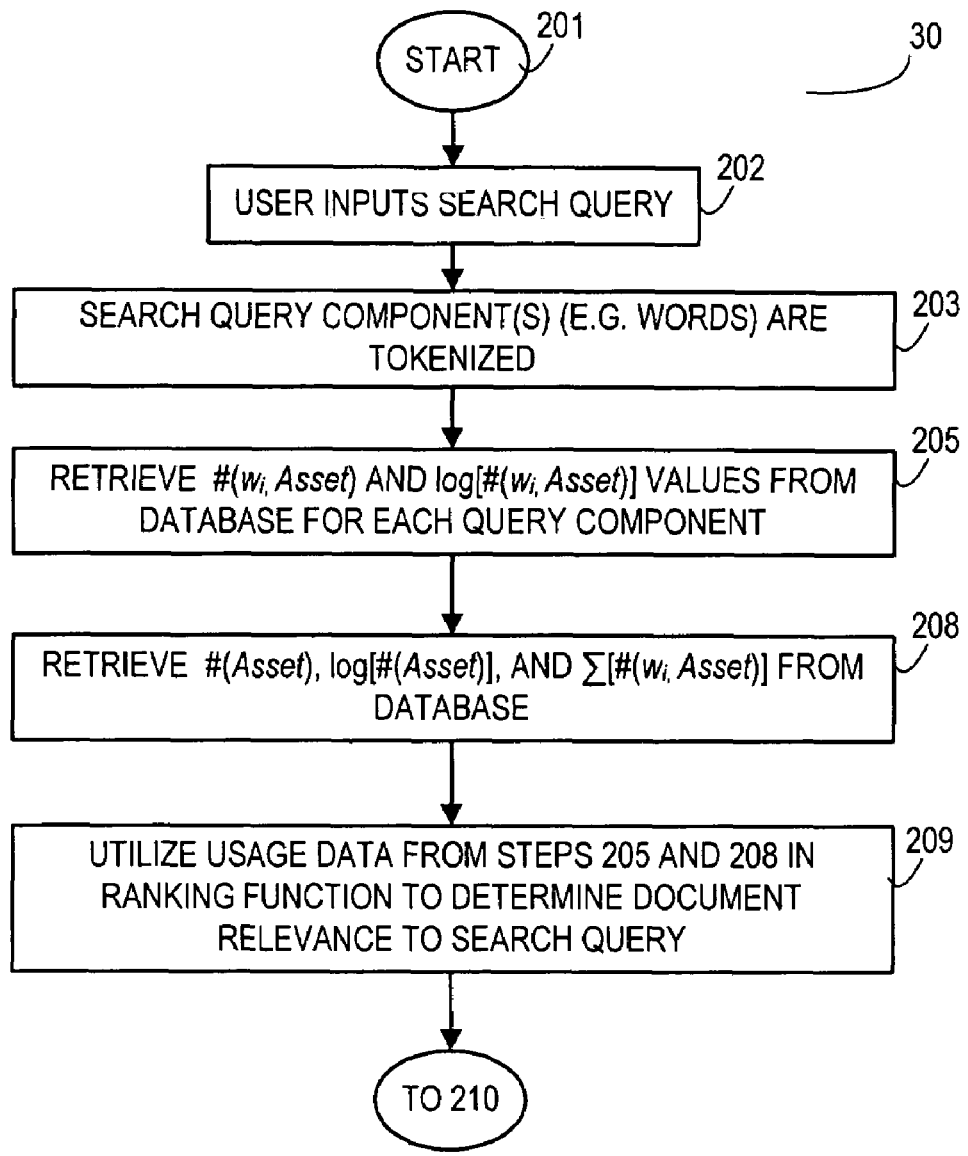
FIGS. 3A-3B represent a logic flow diagram showing exemplary steps in an exemplary method of producing ranked search results using an incrementally updatable model.
Figure 3B:
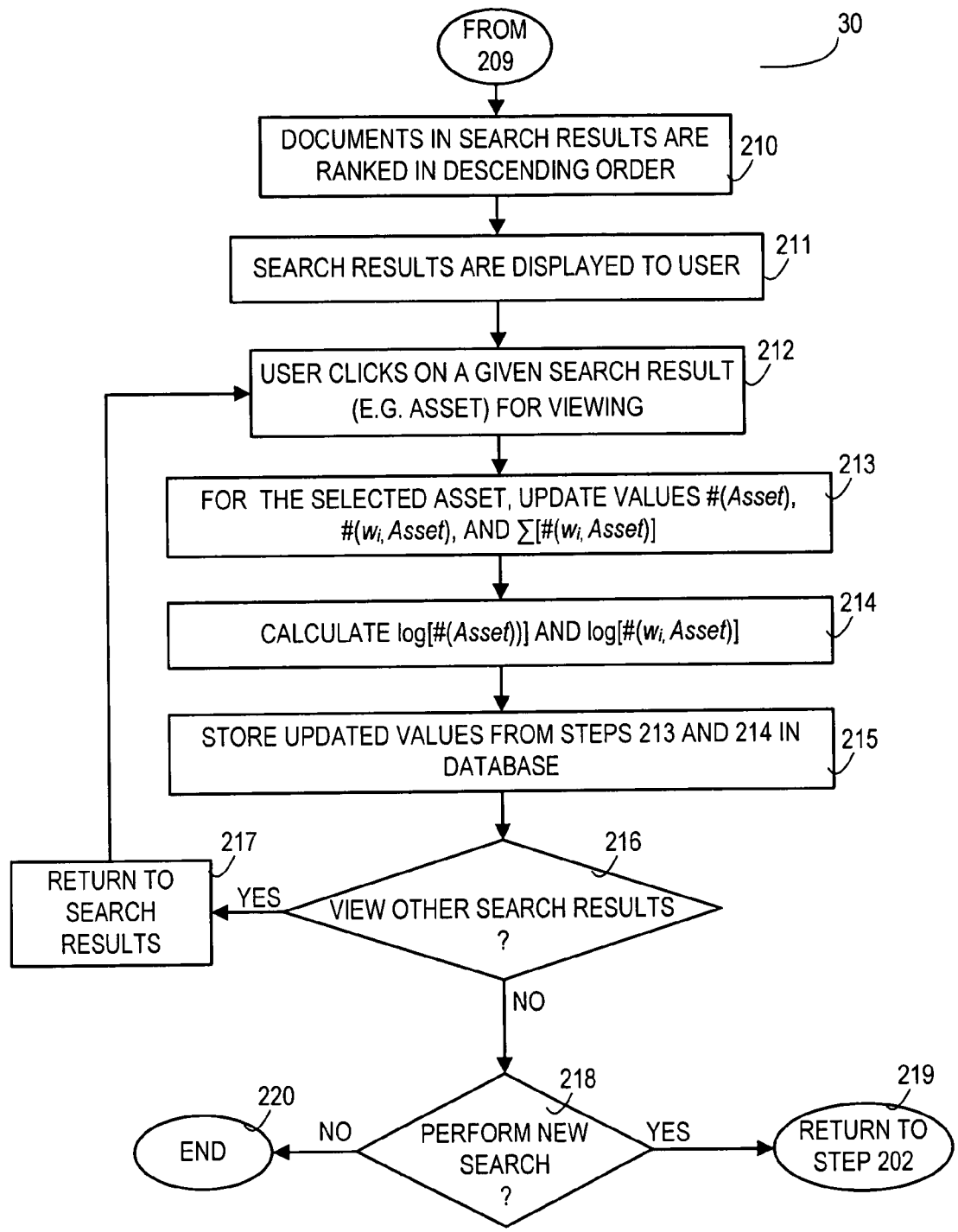

FIGS. 3A-3B represent a logic flow diagram showing exemplary steps in an exemplary method of producing ranked search results in response to a search query inputted by a user, wherein the method utilizes user response data in an incrementally-updatable system. As shown in FIG. 3, exemplary method 30 starts at block 201 and proceeds to step 202, wherein a user inputs a search query such as a single word or a string of words or terms. From step, 202, exemplary method 30 proceeds to step 203, wherein the search query component(s) are "tokenized." As used herein, the term "tokenized" refers to a process in which a word-breaker is used to create a list of "tokens" from a string of words or terms. For example, the search query "printing problems color" would be tokenized to form the set of tokens/search query components {"printing", "problems", "color"}. Each "token" in the list represents each search query component, $w_i$, used in the query classifier formulation described above.

From step 203, exemplary method 30 proceeds to step 205, wherein the pre-calculated, stored values #($w_i$, Asset) and log [#($w_i$, Asset)] are retrieved from a database for each query component, $w_i$ (e.g., "printing", "problems", and "color"). From step 205, exemplary method 30 proceeds to step 208, wherein the pre-calculated, stored values #(Asset), log [#(Asset)], and Σ#($w_i$, Asset) are retrieved from the data storage database. From step 208, exemplary method 30 proceeds to step 209, wherein the usage data from steps 205 and 208, namely (1) values #($w_i$, Asset) and log [#($w_i$, Asset)] for each query term/asset combination, and (2) values #(Asset), log [#(Asset)], and Σ#($w_i$, Asset) for each asset, are utilized in formula (I) provided above to determine the document relevance of each document in the network space relative to the search query.

From step 209, exemplary method 30 proceeds to step 210 shown in FIG. 3B, wherein all documents are ranked in descending order of relevance. Exemplary method 30 then proceeds to step 211, wherein at least a portion of the search results are displayed to the user. From step 211, exemplary method 30 proceeds to step 212, wherein the user selects (e.g., clicks on) a given search result (e.g., asset) for viewing.

Once a particular document or search result (e.g., asset) is selected for viewing, exemplary method 30 proceeds to step 213, wherein the count values #(Asset), #($w_i$, Asset), and Σ#($w_i$, Asset) are updated to reflect the user response. It should be noted that the process of updating count values #(Asset), #($w_i$, Asset), and Σ#($w_i$, Asset) may occur at any time after the user selects a given search result (e.g., asset). For example, the count values may be updated immediately or may be updated at some time following the actual selection of a given search result. The count values may be updated, for example, every hour or a single time during a 24 hour period. If the values are not updated immediately, a log is maintained over a given time period (e.g., for a 24 hour time period) to temporarily store user response data during the time period. At the end of each time period, application code is used to update each count value.

From step 213, exemplary method 30 proceeds to step 214, wherein the values log [#(Asset)] and log [#($w_i$, Asset)] are calculated. From step 214, exemplary method 30 proceeds to step 215, wherein the updated values from steps 213 and 214 (i.e., #(Asset), #($w_i$, Asset), Σ#($w_i$, Asset), log [#(Asset)] and log [#($w_i$, Asset)]) are stored in the database, replacing the previously stored values.

From step 215, exemplary method 30 proceeds to decision block 216, wherein a determination is made by the user whether to view other search results provided in step 211. If a determination is made by the user to view other search results provided in step 211, exemplary method 30 proceeds to step 216, wherein the user returns to the search results provided in step 211. From step 217, exemplary method 30 returns to step 212, and proceeds as described above.

Returning to decision block 216, if a determination is made by the user at decision block 216 not to view other search results provided in step 211, exemplary method 30 proceeds to decision block 218. At decision block 218, a determination is made by the user whether to perform a new search. If a determination is made by the user to perform a new search, exemplary method 30 proceeds to step 219, wherein exemplary method 30 returns to step 202 and proceeds as described above. If a determination is made by the user at decision block 216 not to perform a new search, exemplary method 30 proceeds to step 220, wherein exemplary method 30 ends.

The above-described method of providing ranked search results to a user in an incrementally-updatable system may further comprise a time-decay component, wherein more recent query/asset data is given more weight when computing values #(Asset), #($w_i$, Asset), Σ#($w_i$, Asset), log [#(Asset)] and log [#($w_i$, Asset)] compared to older query/asset data. For example, the query term "Trojan" might have meant something very different 2000 years ago, as oppose to what the term meant several years ago when a sports team named "Trojan" won a college football title, and what the term meant recently when the "Trojan Horse" virus appeared as a computer virus. Having a time-decayed component in the disclosed methods provides a bias toward more recent user preferences, as well as more recent events.

When utilizing the time-decay component, a weighing multiplier is used to weight more recent events to a greater extent than past events. An exemplary weighing multiplier comprises $\lambda^t$, wherein $\lambda$ is a number less than 1.0 and t is an integer representing the age of a query and/or asset count value component (e.g., t may represent a given 24 hour period so that t=0 would represent the last 24 hour period, t=1 would represent the previous 24 hour period, t=2 would represent the 24 hour period prior to the t=1 24 hour period, etc.). The above-described count values used in Formula (I) may be set to equal the following values:

$$\#(\text{Asset}) = \#(\text{Asset})(0) + \lambda[\#(\text{Asset})(1)] + \lambda^2[\#(\text{Asset})(2)] +$$
$$\lambda^3[\#(\text{Asset})(3)] + \ldots$$
$$= \sum_{t=0}^{\infty} \lambda^t[\#(\text{Asset})(t)];$$

$$\#(w_i, \text{Asset}) = \#(w_i, \text{Asset})(0) + \lambda \#(w_i, \text{Asset})(1)] +$$
$$\lambda^2[\#(w_i, \text{Asset})(2)] + \lambda^3[\#(w_i, \text{Asset})(3)] + \ldots$$
$$= \sum_{t=0}^{\infty} \lambda^t[\#(w_i, \text{Asset})(t)];$$

and $$\Sigma \#(w_i, \text{Asset}) = \Sigma \#(w_i, \text{Asset})(0) + \lambda[\Sigma \#(w_i, \text{Asset})(1)] + \lambda^2$$
$$[\Sigma \#(w_i, \text{Asset})(2)] +$$
$$\lambda^3[\Sigma \#(w_i, \text{Asset})(3)] + \ldots$$
$$= \sum_{t=0}^{\infty} \lambda^t[\Sigma \#(w_i, \text{Asset})(t)].$$

In each of the above count values, as t increases (i.e., the age of the query and/or asset component increases), the value of $\lambda^t$ decreases, resulting in older components of a given count value being given less weight than more current count value components. For example, in an exemplary embodiment in which the frequency is a 24 hour period, brand new queries (i.e., queries during the last 24 hour period) are given a weight of 1 while a query that is a day old (i.e., queries during the previous 24 hour period) is given a weight of $\lambda$ and a query that is 100 days old is given a weight of $\lambda^{100}$. By setting $\lambda$ to a value such as 0.995 in the above model, the weight of a given query decays gradually over a period of 2 years.

In order to update the count values at the end of a given time period (e.g., at the end of a 24 hour period), the count values simply need to be recalculated as follows:

$$\#(Asset)(new) = \#(Asset)(0) + \lambda[\#(Asset)(old)];$$

$$\#(w_i, Asset)(new) = \#(w_i, Asset)(0) + \lambda[\#(w_i, Asset)(old)]; \text{ and}$$

$$\Sigma\#(w_i, Asset)(new) = \Sigma\#(w_i, Asset)(0) + \lambda[\Sigma\#(w_i, Asset)(old)],$$

wherein:

$\#(Asset)(new)$, $\#(w_i, Asset)(new)$ and $\Sigma\#(w_i, Asset)(new)$ represent the incrementally updated values for the counts $\#(Asset)$, $\#(w_i, Asset)$ and $\Sigma\#(w_i, Asset)$ respectively;

$\#(Asset)(0)$, $\#(w_i, Asset)(0)$ and $\Sigma\#(w_i, Asset)(0)$ represent the number of occurrences within the last time period (e.g., the last 24 hour period) for the counts $\#(Asset)$, $\#(w_i, Asset)$ and $\Sigma\#(w_i, Asset)$ respectively; and $\#(Asset)(old)$, $\#(w_i, Asset)(old)$ and $\Sigma\#(w_i, Asset)(old)$ represent the cumulative count values prior to the last time period (e.g., the count values more than 24 hours ago) for the counts $\#(Asset)$, $\#(w_i, Asset)$ and $\Sigma\#(w_i, Asset)$ respectively. Such a method using an incrementally-updatable, time-decay model is further described with reference to FIGS. 4A-4B.

Figure 4A:
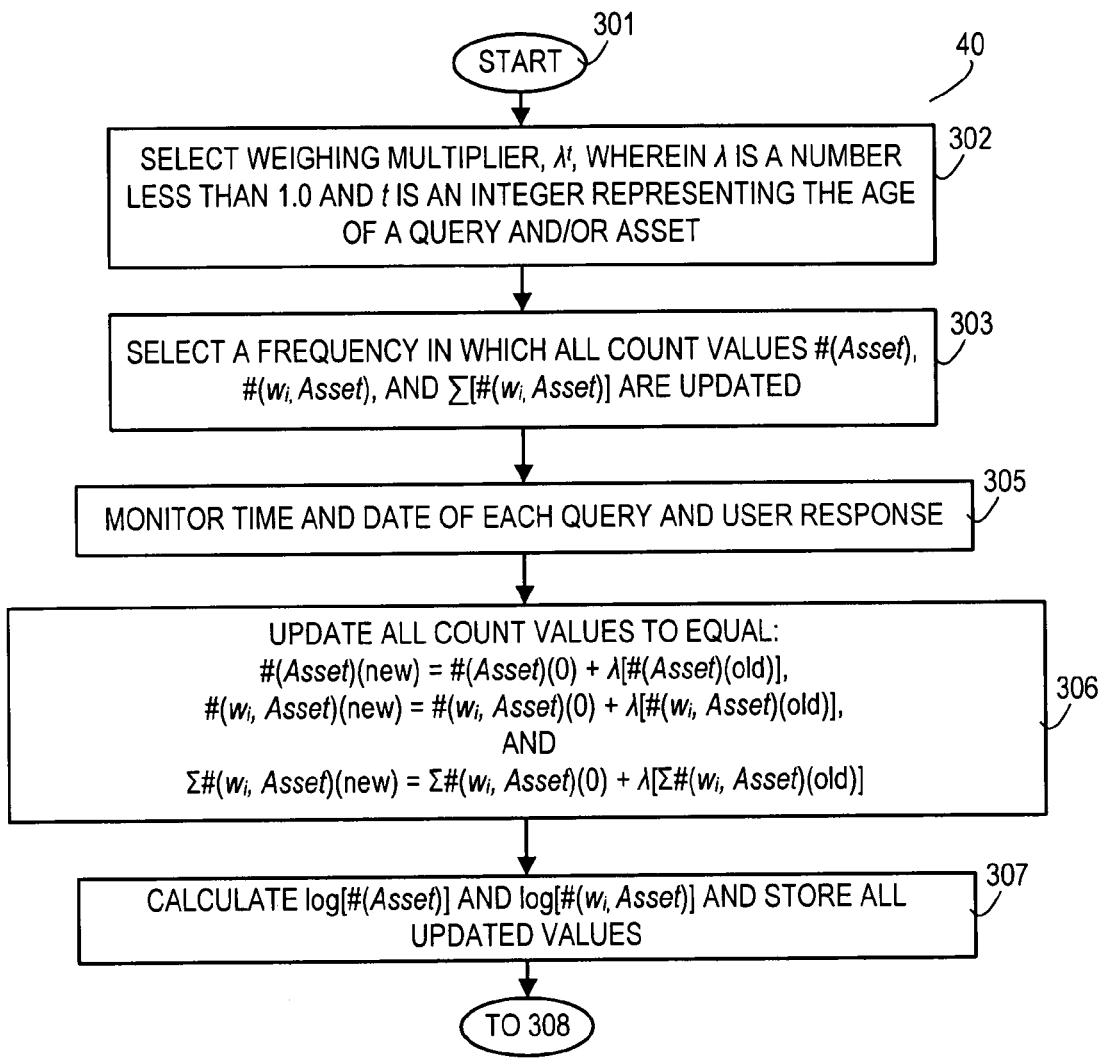
FIGS. 4A-4B represent a logic flow diagram showing exemplary steps in a method of producing ranked search results using an incrementally updatable model that further comprises a time-decay component.

As shown in FIG. 4A, exemplary method 40 starts at start block 301 and proceeds to step 302, wherein a user selects a weighing multiplier, $\lambda^t$, wherein $\lambda$ is a number less than 1.0 and t is an integer representing the age of a query and/or asset count value component. From step 302, exemplary method 40 proceeds to step 303, wherein a user selects a frequency in which all count values $\#(Asset)$, $\#(w_i, Asset)$, and $\Sigma\#(w_i, Asset)$ are updated. Typically, all count values are updated once during a 24 hour period (i.e., each unit of time represented by t is a 24 hour time period); however, a user may choose any desired frequency, such as a count value update every hour (i.e., each unit of time represented by t is an hour of time).

From step 303, exemplary method 40 proceeds to step 305, wherein the time and date is monitored so that a given query and user response may be dated. From step 305, exemplary method 40 proceeds to step 306, wherein the count values are incrementally updated (e.g., updated at the end of a given frequency period) as described above. In this step, all that is required to incrementally update each count value is to add new query/asset combination data (i.e., $\#(Asset)(0)$, $\#(w_i, Asset)(0)$ and $\Sigma\#(w_i, Asset)(0)$ data) with a weight of 1.0 to the previously stored count value (i.e., $\#(Asset)(old)$, $\#(w_i, Asset)(old)$ and $\Sigma\#(w_i, Asset)(old)$) time-decayed by a factor of $\lambda$. As discussed above, the updated count values equal:

$$\#(Asset)(new) = \#(Asset)(0) + \lambda[\#(Asset)(old)];$$

$$\#(w_i, Asset)(new) = \#(w_i, Asset)(0) + \lambda\#(w_i, Asset)(old)]; \text{ and}$$

$$\Sigma\#(w_i, Asset)(new) = \Sigma\#(w_i, Asset)(0) + \lambda[\Sigma\#(w_i, Asset)(old)].$$

Figure 4B:
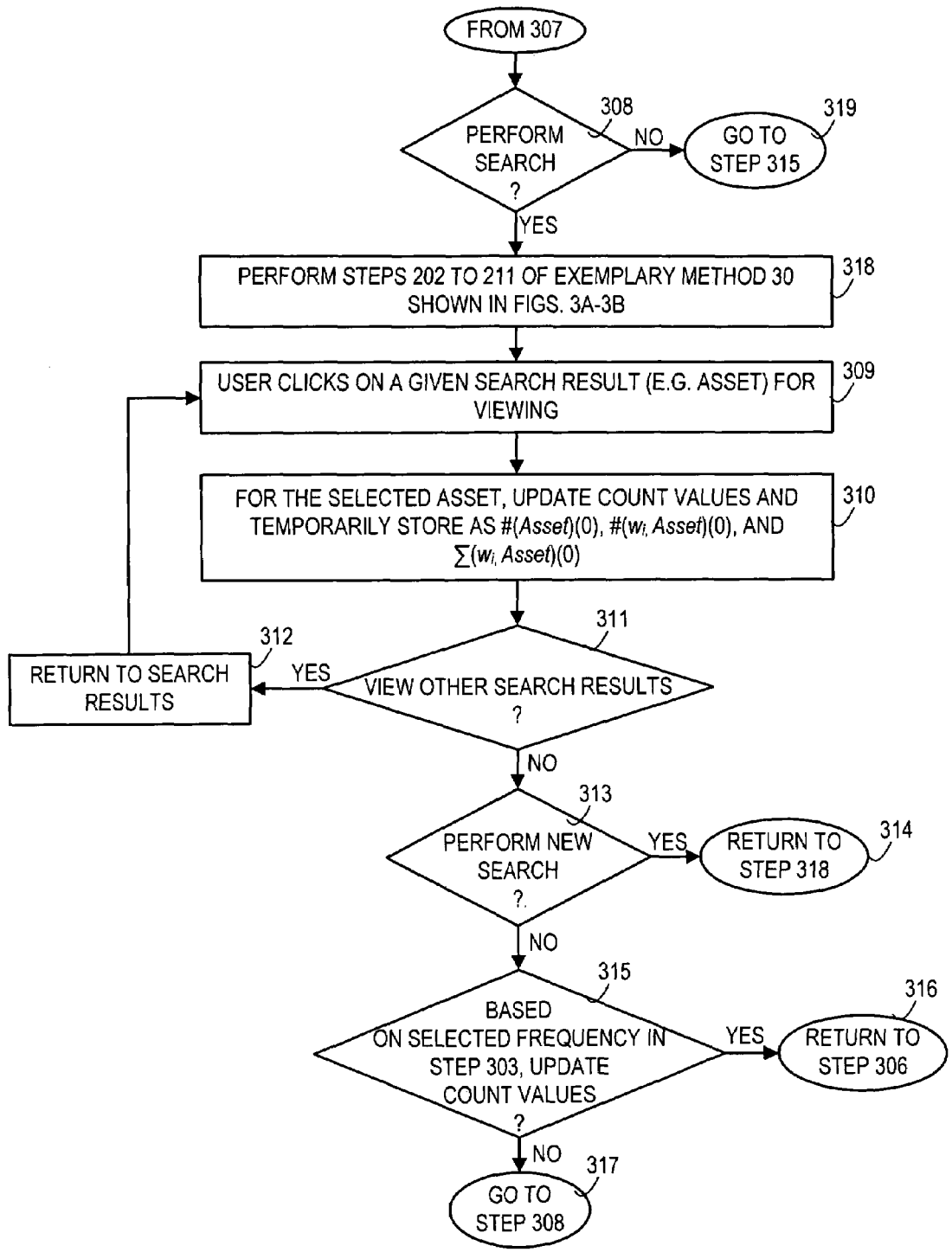

From step 306, exemplary method 40 proceeds to step 307, wherein the values of log [$\#(Asset)$] and log [$\#(w_i, Asset)$] are calculated, and all updated values are stored in the database. From step 307, exemplary method 40 proceeds to decision block 308 as shown in FIG. 4B, wherein a determination is made by a user whether to perform a search. If a determination is made by a user to perform a search at decision block 308, exemplary method 40 proceeds to step 318, wherein the above-described steps 202 to 211 of exemplary method 30 (shown in FIGS. 3A-3B) are performed. From step 318, exemplary method 40 proceeds to step 309, wherein the user selects (e.g., clicks on) a given search result (e.g., asset) for viewing.

Once a particular document or search result (e.g., asset) is selected for viewing, exemplary method 40 proceeds to step 310, wherein the values $\#(Asset)(0)$, $\#(w_i, Asset)(0)$, and $\Sigma\#(w_i, Asset)(0)$ are updated to reflect the user response. The $\#(Asset)(0)$, $\#(w_i, Asset)(0)$, and $\Sigma\#(w_i, Asset)(0)$ values are temporarily stored until the end of a frequency period (e.g., the end of a 24 hour period). As discussed above, the frequency period may be any desired length of time, but is typically a 24 hour period. At the end of each time period, application code is used to update each count value, $\#(Asset)$, $\#(w_i, Asset)$, and $\Sigma\#(w_i, Asset)$ so as to provide incrementally updated count values $\#(Asset)(new)$, $\#(w_i, Asset)(new)$, and $\Sigma\#(w_i, Asset)(new)$, as described in step 306.

From step 310, exemplary method 40 proceeds to decision block 311, wherein a determination is made by the user whether to view other search results, provided in 318 (i.e., step 211 of exemplary method 30, which is a component of step 318 of exemplary method 40). If a determination is made by the user to view other search results provided in step 318, exemplary method 40 proceeds to step 312, wherein the user returns to the search results provided in step 318. From step 312, exemplary method 40 returns to step 309, and proceeds as described above.

Returning to decision block 311, if a determination is made by the user at decision block 311 not to view other search results provided in step 318, exemplary method 40 proceeds to decision block 313. At decision block 313, a determination is made by the user whether to perform a new search. If a determination is made by the user to perform a new search, exemplary method 40 proceeds to step 314, wherein exemplary method 40 returns to step 318 and proceeds as described above. If a determination is made by the user at decision block 313 not to perform a new search, exemplary method 40 proceeds to decision block 315, wherein a determination is made by application code whether, based on the selected frequency in step 303, the count values, $\#(Asset)$, $\#(w_i, Asset)$, and $\Sigma\#(w_i, Asset)$, need to be updated. If a determination is made by application code that the count values need to be updated (i.e., a frequency time period has ended), exemplary method 40 returns to step 306 and proceeds as described above. If at decision block 315, a determination is made by application code that the count values do not need to be updated, exemplary method 40 returns to step 308 and proceeds as described above.

Returning to decision block 308, if a determination is made by the user at decision block 308 not to perform a search, exemplary method 40 proceeds to step 319, wherein exemplary method 40 returns to decision block 315 and proceeds as described above.

The above-described methods of ranking documents in response to a search query using an incrementally-updatable system with or without a time-decay component may be used alone or in combination with other ranking function components so as to provide ranked search results to a user. When used in combination with other ranking function components, any known ranking function component or components may be used. Known ranking function components may include, but are not limited to, (i) a field weighted ranking function component as described in U.S. patent application Ser. No. 10/804,326 entitled "FIELD WEIGHTING IN TEXT DOCUMENT SEARCHING," filed on Mar. 18, 2004, the subject matter of which is incorporated herein by reference in its entirety; (ii) a click distance ranking function component as disclosed in U.S. patent application Ser. No. 10/955,983 entitled "SYSTEM AND METHOD FOR RANKING SEARCH RESULTS USING CLICK DISTANCE" filed on Aug. 30, 2004, the subject matter of which is incorporated herein by reference in its entirety; (iii) a biased click distance ranking function component as disclosed in U.S. patent application Ser. No. 11/206,286 entitled "RANKING FUNCTIONS USING A BIASED CLICK DISTANCE OF A DOCUMENT ON A NETWORK" filed on Aug. 15, 2005, the subject matter of which is incorporated herein by reference in its entirety; (iv) a URL depth of a document; or (v) any combination of (i) to (iv).

Computing systems are also disclosed herein. An exemplary computing system contains at least one application module usable on the computing system, wherein the at least one application module comprises application code loaded thereon, wherein the application code performs a method of ranking documents on a network using the above-described incrementally-updatable query classifier with or without a time-decay component. The application code may be loaded onto the computing system using any of the above-described computer readable medium having thereon computer-executable instructions for ranking documents on a network using the above-described incrementally-updatable query classifier with or without a time-decay component as described above.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the disclosed methods, computer readable medium, and computing systems should be assessed as that of the appended claims and any equivalents thereto.

What is claimed is:

1. A computer readable storage medium having stored computer-executable instructions that when executed by a computer cause the computer to:

rank documents on a network in response to a user inputted search query comprising one or more search query terms utilizing an incrementally-updatable query classifier for ranking the documents based on usage data;

display documents to the user ranked by the query classifier based on usage data comprising pre-calculated values $\#(w_i, \text{Asset})$ and $\log[\#(w_i, \text{Asset})]$ stored for each of the search query terms and pre-calculated values $\#(\text{Asset})$, $\log[\#(\text{Asset})]$ and $\Sigma\#(w_i, \text{Asset})$ stored for each of the documents; and update the usage data in response to the user selecting a document for viewing by;

updating count values $\#(\text{Asset})$, $\#(w_i, \text{Asset})$ and $\Sigma\#(w_i, \text{Asset})$, calculating values $\log[\#(\text{Asset})]$ and $\log[\#(w_i, \text{Asset})]$, and storing updated usage data replacing the pre-calculated values, wherein:

$\#(\text{Asset})$ represents a number of times that a given document on the network is selected for viewing, $\log[\#(\text{Asset})]$ represents a log of $\#(\text{Asset})$, $\#(w_i, \text{Asset})$ represents a number of times that a given document on the network and a search query term, w1, of the search query are matched, $\log[\#(w_i, \text{Asset})]$ represents a log of $\#(w_i, \text{Asset})$, and $\Sigma\#(w_i, \text{Asset})$ represents a sum of the number of times that a given document on the network and a search query term, $w_i$, of the search query are matched.

2. The computer readable storage medium of claim 1, wherein each document on the network is ranked based on its relevance to the search query and is provided a document relevance score using formula (I):

$$\log[P(\text{Asset} | \text{Query})] = \log[\#(\text{Asset})] - \log[\#(T)] + \sum_{i=1}^{N_Q} \quad (I)$$

$$(\log[\#(w_i, \text{Asset})] - \log[\#(\text{Asset})] +$$

$$\frac{\#(w_i, \text{Asset})}{\#(\text{Asset})}) - \sum_{i=1}^{V} \frac{\#(w_i, \text{Asset})}{\#(\text{Asset})}$$

wherein:

$P(\text{Asset}|\text{Query})$ represents a probability of returning a given document, Asset, given a particular user inputted search query, Query;

$N_Q$ is the number of terms in the search query;

V is the size of the vocabulary of the network; and $\#(T)$ is the total number of search queries that have been processed.

3. The computer readable storage medium of claim 1, wherein the incrementally-updatable query classifier is updated at an end of each time period, said time period being equal to or less than 24 hours in length.

4. The computer readable storage medium of claim 3, wherein updating count values $\#(\text{Asset})$, $\#(w_i, \text{Asset})$ and $\Sigma\#(w_i, \text{Asset})$ comprises adding new data that has been collected during said time period to previously stored count values $\#(\text{Asset})(\text{old})$, $\#(w_i, \text{Asset})(\text{old})$ and $\Sigma\#(w_i, \text{Asset})(\text{old})$.

5. The computer storage readable medium of claim 1, wherein the incrementally-updatable query classifier further comprises a time-decay component, wherein recent search queries and user responses are given more weight than past search queries and user responses.

6. The computer readable storage medium of claim 5, wherein:

$$\#(\text{Asset}) = \sum_{t=0}^{\infty} \lambda^t [\#(\text{Asset})(t)];$$

$$\#(w_i, \text{Asset}) = \sum_{t=0}^{\infty} \lambda^t [\#(w_i, \text{Asset})(t)]; \text{ and}$$

$$\Sigma \#(w_i, \text{Asset}) = \sum_{t=0}^{\infty} \lambda^t [\Sigma \#(w_i, \text{Asset})(t)];$$

wherein:

$\lambda$ is a weighing multiplier having a value of less than 1.0; and t is an integer representing an age of a count value component.

7. The computer readable medium of claim 6, wherein updating count values $\#(\text{Asset})$, $\#(w_i, \text{Asset})$ and $\Sigma\#(w_i, \text{Asset})$ comprises recalculating $\#(\text{Asset})$, $\#(w_i, \text{Asset})$ and $\Sigma\#(w_i, \text{Asset})$ as follows:

$\#(\text{Asset})(\text{new})=\#(\text{Asset})(0)+\lambda[\#(\text{Asset})(\text{old})];$ $\#(w_i, \text{Asset})(\text{new})=\#(w_i, \text{Asset})(0)+\lambda\#(w_i, \text{Asset})(\text{old})];$ and $\Sigma\#(w_i, \text{Asset})(\text{new})=\Sigma\#(w_i, \text{Asset})(0)+\lambda[\Sigma\#(w_i, \text{Asset})(\text{old})];$ wherein:
(Asset)(new), #($w_i$, Asset)(new) and Σ#($w_i$, Asset)(new) each independently represent incrementally updated values for count values #(Asset), #($w_i$, Asset) and Σ#($w_i$, Asset) respectively;

(Asset)(0), #($w_i$, Asset)(0) and Σ#($w_i$, Asset)(0) each independently represent a number of occurrences within a last time period respectively; and

(Asset)(old), #($w_i$, Asset)(old) and Σ#($w_i$, Asset)(old) each independently represent cumulative count values prior to the last time period respectively.

8. The computer readable storage medium of claim 1, further comprising computer-executable instructions for accepting the search inquiry inputted by a user, conducting a search of the documents on the network to generate search results comprising multiple documents, ranking the multiple documents of the search results using the incrementally-updatable query classifier to generate ranked search results, and displaying the ranked search results to the user.

9. A computing system containing the computer readable storage medium of claim 1 and executing said stored computer-executable instructions.

10. A computer implemented method of incrementally updating a query classifier component in a search engine of a computer, said method comprising:
determining count values #(Asset), #($w_i$, Asset) and Σ#($w_i$, Asset), wherein #(Asset) represents a number of times that a given document on the network is selected for viewing, #($w_i$, Asset) represents a number of times that a given document on the network and a search query term, $w_i$, of the search query are matched, and Σ#($w_i$, Asset) represents a sum of the number of times that a given document on the network and a search query term, $w_i$, of the search query are matched;
calculating values log[#(Asset)] and log[#($w_i$, Asset)], wherein log[#(Asset)] represents a log of #(Asset) and log[#($w_i$, Asset)] represents a log of #($w_i$, Asset);
storing the count values #(Asset), #($w_i$, Asset) and Σ#($w_i$, Asset) and calculated values log[#(Asset)] and log[#($w_i$, Asset)] in a database of the computer, wherein the values #($w_i$, Asset) and log[#($w_i$, Asset)] are stored for search query terms and the values #(Asset), log[#(Asset)] and Σ#($w_i$, Asset) are stored for documents;
displaying documents to one or more users ranked by the query classifier based on previously stored count values and calculated values in response to user inputted search queries received by the search engine of the computer;
receiving responses during a time period from the one or more users selecting documents for viewing; and
updating the stored count values and calculated values by adding new data collected during the time period to the previously stored count values #(Asset), #($w_i$, Asset) and Σ#($w_i$, Asset) and the previously stored calculated values log[#(Asset)] and log[#($w_i$, Asset)].

11. The method of claim 10, wherein the time period is equal to or less than 24 hours in length.

12. The method of claim 10, wherein updating stored count values #(Asset), #($w_i$, Asset) and Σ#($w_i$, Asset) comprises recalculating #(Asset), #($w_i$, Asset) and Σ#($w_i$, Asset) as follows:

(Asset)(new)=#(Asset)(0)+λ[#(Asset)(old)];

($w_i$, Asset)(new)=#($w_i$, Asset)(0)+λ#($w_i$, Asset)(old)]; and

Σ#($w_i$, Asset)(new)=Σ#($w_i$, Asset)(0)+λ[Σ#($w_i$, Asset)(old)];

wherein:
(Asset)(new), #($w_i$, Asset)(new) and Σ#($w_i$, Asset)(new) represent incrementally updated values for count values #(Asset), #($w_i$, Asset) and Σ#($w_i$, Asset) respectively;

(Asset)(0), #($w_i$, Asset)(0) and Σ#($w_i$, Asset)(0) represent a number of occurrences within a last time period respectively;

(Asset)(old), #($w_i$, Asset)(old) and Σ#($w_i$, Asset)(old) represent cumulative count values prior to the last time period respectively; and λ is a weighing multiplier.

13. The method of claim 12, wherein λ has a value of less than 1.0.

14. The method of claim 10 further comprising:
determining a document relevance score for a document on a network relative to a user inputted search query.

15. The method of claim 14, wherein the document relevance score is determined using formula (I):

$$\log[P(\text{Asset} \mid \text{Query})] = \log[\#(\text{Asset})] - \log[\#(T)] + \sum_{i=1}^{N_Q} (\log[\#(w_i, \text{Asset})] - \log[\#(\text{Asset})] + \frac{\#(w_i, \text{Asset})}{\#(\text{Asset})}) - \sum_{i=1}^{V} \frac{\#(w_i, \text{Asset})}{\#(\text{Asset})} \quad (I)$$

wherein:
P(Asset|Query) represents a probability of returning a given document, Asset, given a particular user inputted search query, Query;
$N_Q$ is the number of terms in the search query;
V is the size of the vocabulary of the network; and
(T) is the total number of search queries that have been processed.

16. The method of claim 14 farther comprising:
ranking documents in descending order based on document relevance scores determined for each document.

17. A computer readable storage medium having stored computer-executable instructions that are executed by a computer and cause the computer to perform the method of claim 10.

18. A computing device comprising a processing unit executing at least one application module stored in memory on the computing device, wherein the at least one application module comprises application code executable by the processing unit of the computing device for performing a method of ranking documents on a network based on document relevance to a user inputted search query, said method comprising the steps of:
utilizing formula (I) to determine a document relevance score for each document; and
ranking documents in descending order based on the document relevance score for each document;
wherein formula (I) comprises $$\log[P(\text{Asset} \mid \text{Query})] = \log[\#(\text{Asset})] - \log[\#(T)] + \sum_{i=1}^{N_Q} (\log[\#(w_i, \text{Asset})] - \log[\#(\text{Asset})] + \frac{\#(w_i, \text{Asset})}{\#(\text{Asset})}) - \sum_{i=1}^{V} \frac{\#(w_i, \text{Asset})}{\#(\text{Asset})} \quad (I)$$

wherein:

P(Asset|Query) represents a probability of returning a given document, Asset, given a particular user inputted search query, Query;

$N_Q$ is the number of terms in the search query;

V is the size of the vocabulary of the network;

(T) is the total number of search queries that have been processed;

(Asset) represents a number of times that a given document on the network is selected for viewing;

log[#(Asset)] represents a log of #(Asset);

($w_i$, Asset) represents a number of times that a given document on the network and a search query term, $w_i$, of the search query are matched;

log[#($w_i$, Asset)] represents a log of #($w_i$, Asset); and

Σ#($w_i$, Asset) represents a sum of the number of times that a given document on the network and a search query term, $w_i$, of the search query are matched.

19. The computing device of claim 18, wherein count values #(Asset), #($w_i$, Asset) and Σ#($w_i$, Asset) are incrementally updatable, and are represented by:

$$\#(\text{Asset}) = \sum_{t=0}^{\infty} \lambda^t [\#(\text{Asset})(t)];$$

$$\#(w_i, \text{Asset}) = \sum_{t=0}^{\infty} \lambda^t [\#(w_i, \text{Asset})(t)]; \text{ and}$$

$$\Sigma \#(w_i, \text{Asset}) = \sum_{t=0}^{\infty} \lambda^t [\Sigma \#(w_i, \text{Asset})(t)];$$

wherein:

λ is a weighing multiplier having a value equal to or less than 1.0; and t is an integer representing an age of a count value component.

20. The computing device of claim 19, wherein λ is less than 1.0.

* * * * *